(12) United States Patent
Jones et al.

(10) Patent No.: US 12,471,034 B2
(45) Date of Patent: Nov. 11, 2025

(54) OPTIMIZING COVERAGE AND POWER USAGE IN A NETWORK DEPLOYING AN UNLICENSED BAND

(71) Applicant: T-MOBILE INNOVATIONS LLC, Overland Park, KS (US)

(72) Inventors: David Charles Jones, Bellevue, WA (US); Anokhi Shah, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/658,408

(22) Filed: May 8, 2024

(65) Prior Publication Data

US 2024/0292341 A1    Aug. 29, 2024

Related U.S. Application Data

(63) Continuation of application No. 17/675,050, filed on Feb. 18, 2022, now Pat. No. 12,010,632.

(51) Int. Cl.
*H04W 52/24* (2009.01)
*H04W 52/16* (2009.01)
*H04W 52/28* (2009.01)
*H04W 52/52* (2009.01)

(52) U.S. Cl.
CPC ......... *H04W 52/244* (2013.01); *H04W 52/16* (2013.01); *H04W 52/283* (2013.01); *H04W 52/52* (2013.01)

(58) Field of Classification Search
CPC ............. H04W 52/244; H04W 52/245; H04W 52/248; H04W 52/16; H04W 52/283; H04W 52/52
See application file for complete search history.

(56) References Cited

U.S. PATENT DOCUMENTS

| | | |
|---|---|---|
| 2015/0163680 A1 | 6/2015 | Valliappan et al. |
| 2017/0230839 A1* | 8/2017 | Cui ................... H04W 74/002 |
| 2020/0382978 A1 | 12/2020 | Manolakos et al. |
| 2021/0119748 A1 | 4/2021 | Damnjanovic et al. |
| 2023/0090516 A1 | 3/2023 | Zhang et al. |

FOREIGN PATENT DOCUMENTS

| | | |
|---|---|---|
| EP | 3081028 B1 | 11/2021 |
| WO | 2014/029095 A1 | 2/2014 |

* cited by examiner

*Primary Examiner* — Keith Ferguson
(74) *Attorney, Agent, or Firm* — Shook, Hardy & Bacon

(57) ABSTRACT

Methods, media, and systems are provided for optimizing coverage and power usage in a network deploying an unlicensed band. A first transmission power associated with a primary carrier and a second transmission power associated with a secondary carrier are determined. Location data and channel state information from a user device utilizing the primary carrier and the secondary carrier are received. An interference level may be determined using the channel state information. Based on the location data and the interference level, the second transmission power associated with the secondary carrier is reduced and the first transmission power of the primary carrier is increased. In some aspects, a beamforming technique is applied for downlink transmissions via a 5G New Radio unlicensed band. In some aspects, upon detection of an increase of 3 dBi antenna gain, the second transmission power is reduced by 1 dBm.

20 Claims, 8 Drawing Sheets

FIG. 5A.

| Transmit Power (dBm) (60gHz) | Antenna Gain (dBi) | EIRP (dBm) |
|---|---|---|
| 82 | 6 | 88 |
| 81 | 9 | 90 |
| 80 | 12 | 92 |
| 79 | 15 | 94 |
| 78 | 18 | 96 |
| 77 | 21 | 98 |
| 76 | 24 | 100 |
| 75 | 27 | 102 |
| 74 | 30 | 104 |

FIG. 5B.

| Transmit Power (dBm) (60gHz) | Antenna Gain (dBi) | EIRP (dBm) |
|---|---|---|
| 30 | 6 | 36 |
| 29 | 9 | 38 |
| 28 | 12 | 40 |
| 27 | 15 | 42 |
| 26 | 18 | 44 |
| 25 | 21 | 46 |
| 24 | 24 | 48 |
| 23 | 27 | 50 |
| 22 | 30 | 52 |

OPTIMIZING COVERAGE AND POWER USAGE IN A NETWORK DEPLOYING AN UNLICENSED BAND

CROSS-REFERENCE TO RELATED APPLICATIONS

This application is a continuation of and claims priority to U.S. application Ser. No. 17/675,050; filed Feb. 18, 2022; and titled "OPTIMIZING COVERAGE AND POWER USAGE IN A NETWORK DEPLOYING AN UNLICENSED BAND." The entirety of which is incorporated herein by reference.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for optimizing coverage and power usage in a network deploying an unlicensed band, substantially as shown in and/or described in connection with at least one of the figures, and as set forth more completely in the claims.

In aspects set forth herein, and at a high level, the systems and methods comprise receiving channel state information and location information from one or more user devices configured to utilize telecommunication services via a primary carrier and a secondary carrier. A first transmission power associated with the primary carrier and a second transmission power associated with the secondary carrier are determined. Based on the channel state information and the location information, the first transmission power of the primary carrier or the second transmission power of the secondary carrier are modified. In some aspects, the first transmission power is increased and the second transmission power is decreased based on the location of the user device being within a range of a cell edge. In some aspects, both the primary carrier and the secondary carrier provide downlink transmissions for a 5G New Radio unlicensed band.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIGS. 5A-5B depict tables including detected antenna gain of antenna elements of an antenna array of a cell site, in accordance with aspects herein;

DETAILED DESCRIPTION

Figure 1:
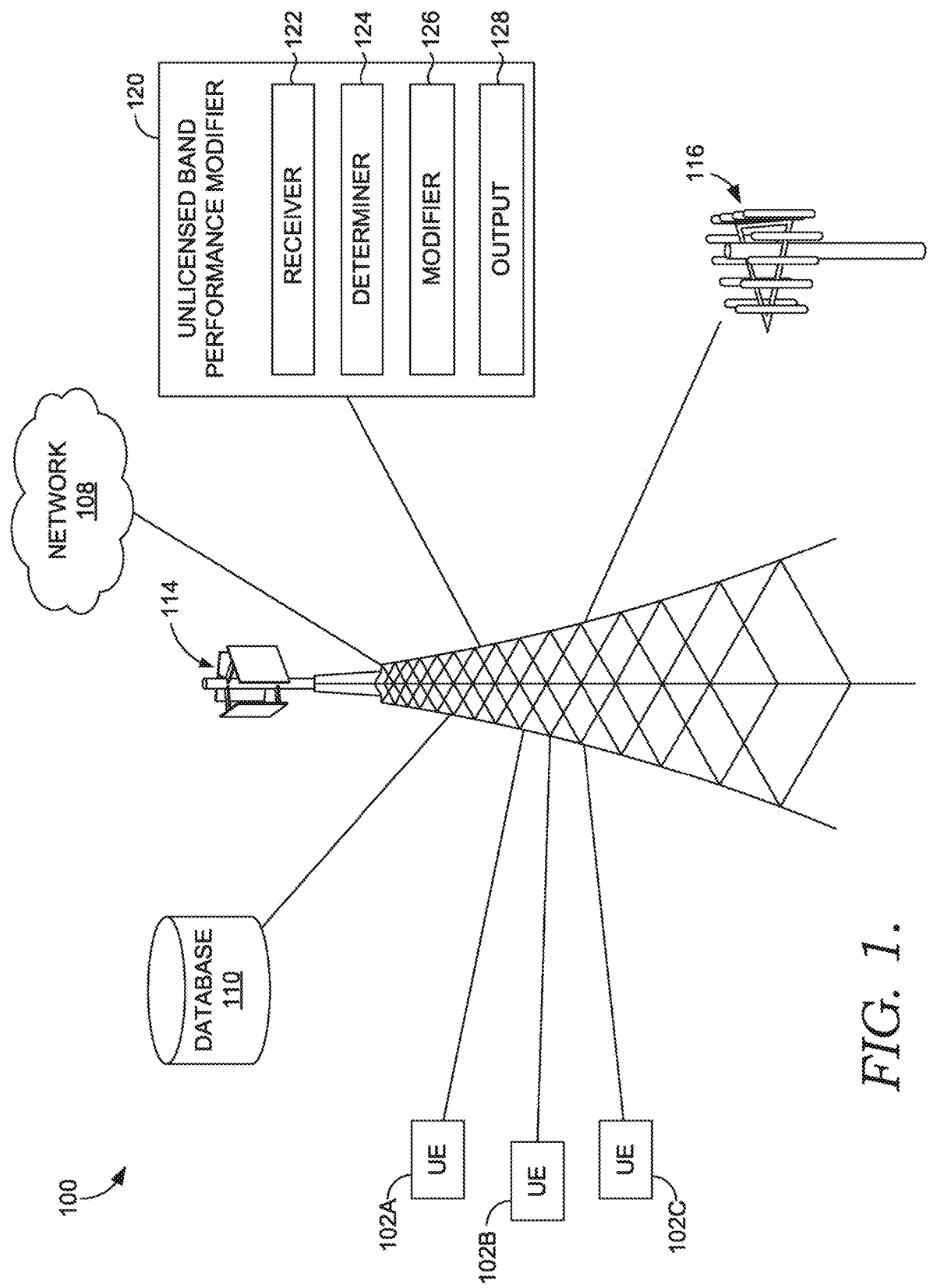
FIG. 1 depicts an example environment comprising a cell site configuration for optimizing coverage and power usage in a network deploying an unlicensed band, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNB Evolved Node B
FDD Frequency Division Duplex
gNB Next Generation Node B
GPRS General Packet Radio Service
GSM Global System for Mobile communications
DVD Digital Versatile Discs
EEPROM Electrically Erasable Programmable Read Only Memory
FD-MIMO Full-Dimension Multiple-Input Multiple-Output
LTE Long Term Evolution
MIMO Multiple-Input Multiple-Output MU-MIMO Multi-User Multiple-Input Multiple-Output
NR New Radio
NR-U NR-Unlicensed
PC Personal Computer
PDA Personal Digital Assistant
RAM Random Access Memory
RF Radio-Frequency
ROM Read Only Memory
RRU Remote Radio Unit
RSRP Reference Transmission Receive Power
RSRQ Reference Transmission Receive Quality
RSSI Received Signal Strength Indicator
SINR Signal-to-Interference and Noise Ratio
TDD Time Division Duplex
TDMA Time Division Multiple Access In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Additionally, a "user device," as used herein, is a device that has the capability of using a wireless communications network, and may also be referred to as a "computing device," "mobile device," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A UE may be, in an embodiment, user devices 102A-102C, described herein with respect to FIG. 1; user device 226, described herein with respect to FIG. 2; user devices 330 and 380, described herein with respect to FIGS. 3A-3B; user devices 330 and 380, described herein with respect to FIGS. 3A-3B; or user devices 402A-402C, described herein with respect to FIG. 4. A UE may also be, in another embodiment, user device 800, described herein with respect to FIG. 8.

A computing device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or combinations thereof. Internet-of-things devices may be stationary, mobile, or both. In some aspects, the computing device is associated with a vehicle (e.g., a video system in a car capable of receiving media content stored by a media device in a house when coupled to the media device via a local area network. In some aspects, the computing device comprises a medical device, a location monitor, a clock, other wireless communication devices, or combinations thereof.

Further, the term "telecommunication services," as used herein, includes wireless communications via the transfer of information via one or more of the following: radio waves (e.g., Bluetooth®), satellite communication, infrared communication, microwave communication, Wi-Fi, and mobile communication. Telecommunication services may be provided via one or more wireless telecommunication technologies or standards, including, but not limited to, CDMA 1xAdvanced, GPRS, Ev-DO, TDMA, GSM, WiMax technology, LTE, LTE Advanced, 4G, 5G, 6G, or other generation communication systems, among other technologies and standards. Telecommunication services may be provided via a network (e.g., the transfer of information without the use of an electrical conductor as the transferring medium).

In aspects, the network may be a telecommunications network(s), or a portion thereof. A telecommunications network might include an array of devices or components (e.g., one or more cell sites). Components such as terminals, links, and nodes (as well as other components) can provide connectivity in various implementations. The network can include multiple networks, as well as being a network of networks. In some aspects, UEs can optionally utilize the network to communicate with other computing devices (e.g., a mobile device(s), a server(s), a personal computer(s), etc.) through a "cell site" or "base station" using any one of a plurality of wireless communication protocols, such as 3G, 4G/LTE, 5G and other related protocols.

As used herein, the term "cell site" generally refers to one or more cellular base stations, nodes, RRUs control components, and the like (configured to provide a wireless interface between a wired network and a wirelessly connected user device). A cell site may comprise one or more nodes (e.g., eNB, gNB, and the like) that are configured to communicate with user devices. A cell site may be, in an embodiment, cell site 114, described herein with respect to FIG. 1; cell sites 212, 216, 220, and 224, described herein with respect to FIG. 2; or cell site 414, described herein with respect to FIG. 4.

As used herein, the term "access point" refers to a device that provides wireless communication services to computing devices. An access point may comprise one or more transceivers for Wi-Fi radio transmission. An access point may include one or more base stations, base transmitter stations, radios, antennas, antenna arrays, power amplifiers, transmitters, receivers, digital signal processors, control electronics, GPS equipment, or a combination thereof. An access point may be considered to be one or more otherwise-discrete components comprising an antenna, a radio, or a controller, and may be alternatively referred to as a "node," in that it is a point of origin for the communication link between the wired and wireless portions of the communication system.

The term "carrier," as used herein, refers to a frequency band that may be associated with an identifier (e.g., a physical cell identifier or a virtual cell identifier for distinguishing cells operating via the same or a different carrier frequency). Cells, or logical communication entities used for communication with a base station, may be configured according to one or more protocol types (e.g., machine-type communication, narrowband internet-of-things, enhanced mobile broadband) for access via different UEs. In some aspects, a cell refers to a geographical coverage area of the base station (e.g., a cell sector). In some aspects, a cell refers to both the logical communication entity and the base station supporting the logical communication entity.

In 5G, the frequency spectrum wherein nodes operate is divided into multiple frequency ranges, such as 450-6,000 MHz; 24,250-52,600 MHz; above 52,600 MHz; and 6,000-24,250 MHz. In a multi-carrier system, such as 5G, a primary carrier frequency carries common and UE-specific control channels and may include a licensed frequency or an unlicensed frequency. The remaining carrier frequencies are secondary carrier frequencies. A secondary carrier frequency may contain only necessary signaling information and that are not UE-specific, since primary uplink and downlinks are typically UE-specific. In aspects, different UEs have different downlink primary carriers. In aspects, different UEs have different uplink primary carriers.

Transmissions by the cell site may have a transmission power may be associated with a macrocell (a high cellular base station that may include a plurality of base stations), a small cell (e.g., a femtocell, a picocell, a microcell), or a combination thereof. In embodiments, cell site may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. In embodiments, carriers may or may not be adjacent to each other. In aspects, allocation of carriers may be asymmetric with respect to downlink and uplink (e.g., more or fewer carriers may be allocated for downlink than for uplink). The transmission power may be reduced, increased, or configured not to transmit (e.g., keep quiet).

An "unlicensed band," as used herein, refers to bands that are available without purchase for spectrum use. A medium of the unlicensed bands may be accessed via listening if the channel is empty. Examples of unlicensed bands include 2.4 GHz, 5.8 GHz, and 60 GHz. Examples of unlicensed band systems include Wi-Fi, Bluetooth, and license assisted access. In the USA, the FCC defines regulations for unlicensed bands viz. 902 to 928 MHz and 2400 to 2483.5 MHz. In Europe, ETSI publishes standards for unlicensed bands such as 863 to 870 MHz and 2400 to 2483.5 MHz. Unlicensed bands may be associated with the 6 GHz spectrum (e.g., 1,200 megahertz of spectrum available for unlicensed use in the 5.925-7.125 GHz), the 5G NR-U spectrum, or the 60 GHz millimeter wave band. In aspects, the specifications for the 5G NR-U spectrum allow devices to access up to 400 MHz in the downlink and 100 MHz of unlicensed spectrum bandwidth in the uplink.

In aspects, anchored NR-U is deployed to combine unlicensed spectrum with licensed spectrum, i.e. license assisted access, or shared spectrum such as citizens broadband radio service. In some embodiments, a 5G private network is deployed entirely with unlicensed spectrum using standalone NR-U. In some embodiments, access is provided to shared and unlicensed spectrum. When operating in unlicensed radio frequency spectrum bands, one or more cell sites and one or more UEs may employ listen-before-talk procedures to ensure a frequency channel is clear before transmitting data. In some embodiments, operations in unlicensed bands may be based on a carrier aggregation configuration in conjunction with carriers operating in a licensed band (e.g., license assisted access). Operations in unlicensed spectrum may include downlink transmissions, uplink transmissions, peer-to-peer transmissions, or a combination of these. Duplexing in unlicensed spectrum may be based on FDD, TDD, or a combination of both.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, power requirements for unlicensed bands based on regulations result in limitations on downlink power levels. For example, indoor and outdoor coverage is largely restricted. Power saving techniques for both indoor and outdoor environments following the regulations and associated with the cell site for optimal performance is desirable. Currently, wasteful energy consumption from on cell site transmissions increase interferences and reduce performance quality. For example, 6 GHz unlicensed devices can operate at low power access points at a 30 dBm limit for 320 MHz, at standard power access points at a 36 dBm limit for 320 MHz, and at a 82 dBm limit for 60 GHz.

The systems and methods provided herein can alleviate the problems discussed above. For instance, in aspects, the systems and methods disclosed herein improve upon performance deficiencies, excess power waste, and interferences by optimizing coverage and power usage in a network deploying an unlicensed band. In one embodiment, a first transmission power associated with a primary carrier and a second transmission power associated with a secondary carrier are determined. Location data from a user device utilizing the primary carrier and the secondary carrier is received. Interference data associated with the secondary carrier is received from the user device. The interference data is determined to be above a threshold. Based on the location data received and the interference data being above the threshold, the second transmission power associated with the secondary carrier is reduced.

In another aspect, channel state information is received from a user device configured to utilize telecommunication services via a primary carrier and a secondary carrier. Based on the channel state information received from the user device, an interference measurement associated with the secondary carrier is determined to be above a threshold. Based on the interference measurement being above the threshold, a first transmission power of the primary carrier or a second transmission power of the secondary carrier is modified.

In yet another aspect, channel state information is received from a user device capable of communicating via a primary carrier and a secondary carrier. Based on the channel state information received from the user device, a first interference measurement associated with the primary carrier is determined and a second interference measurement associated with the secondary carrier is determined. Based on the first interference measurement or the second interference measurement, a first transmission power of the primary carrier or a second transmission power of the secondary carrier is modified.

Turning now to FIG. 1, example environment 100 comprises UEs 102A-102C; network 108; database 110; a cell cite 114; access point 116; unlicensed band performance modifier 120 comprising receiver 122, determiner 124, modifier 126, and output 128. Example environment 100 is but one example of a suitable environment for determining a priority-based pairing threshold for codebook beamforming, and is not intended to suggest any limitation as to the scope of use or functionality of the invention. Neither should the environment 100 be interpreted as having any dependency or requirement relating to any one or combination of components illustrated.

Beginning with UEs 102A-102C, the UEs may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 800 in FIG. 8) that communicates via wireless communications to interact with a public or private network.

In aspects, UEs 102A-102C may be configured to communicate using unlicensed bands in a systems providing 3G, 4G (e.g., LTE), 5G, 6G, other generations, or a combination thereof. For example, the UEs 102A-102C comprise components to establish a 5G connection with a 5G gNB and to be served according to 5G over that connection. In some aspects, UEs 102A-102C may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

In aspects, UEs 102A-102C may have different capabilities. For example, the UEs 102A-102C may have different capabilities for carrier aggregation. In embodiments, some of the UEs 102A-102C are configured to use multiple channels to communicate data with a network. In some aspects, some of the UEs 102A-102C are configured to support a higher number and size of carrier aggregation parameter combinations than some of the other UEs 102A-102C.

In some aspects, the network 108 can be part of a telecommunications network that connects subscribers to their immediate service provider. Cell site 114 can communicate with database 110, other access points (e.g., access point 116), UEs (e.g., UEs 102A-102C), and the unlicensed band performance modifier 120 via the network 108. In some instances, the network 108 can be associated with a telecommunications provider that provides services (e.g., 5G and LTE) to various types of UEs. For example, the network may provide voice, SMS, or data services to user devices or corresponding users that are registered or subscribed to utilize the services provided by a telecommunications provider. The network can comprise any communication network providing voice, SMS, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, and any combination thereof.

Equipment of the network 108 may include core network nodes, relay devices, integrated access and backhaul nodes, macro eNBs, small cell eNBs, gNBs, relay cell sites, or other network equipment. For example, the cell site 114 may interface with the network 108 through one or more wired or wireless backhauls. The cell site 114 and access point 116 may communicate via the network 108 or directly. In embodiments, the network 108 may be a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for UEs served by cell site 114 associated with the evolved packet core.

As shown in FIG. 1, UEs 102A-102C may wirelessly communicate with cell site 114. In some aspects, an eNB or gNB corresponding to cell site 114 may comprise a macro base station, a small cell or femto base station, a relay, and so forth. In aspects, cell site 114 may be configured as FD-MIMO, massive MIMO, 3G, 4G, 5G, another generation communication system, or 802.11. In some aspects, cell site 114 may include one or more band pass filters, radios, antenna arrays, power amplifiers, transmitters/receivers, digital signal processors, control electronics, GPS equipment, and the like. As discussed herein, cell site 114 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs or other types of devices that request to join or are connected to the network 108.

Database 110 can be any type of medium that is capable of storing information. The database can be any collection of records (e.g., network or device information). In one embodiment, the database includes a set of embodied computer-executable instructions that, when executed, facilitate various aspects disclosed herein. In an embodiment, database 110 is implemented on one or more storage devices, such as an array of hard drive disks, random-access memory, tape drives, flash drives, optical drives, or combinations thereof. In addition, although database 110 is depicted as a single entity within FIG. 1, database 110, in some embodiments, may be distributed across many different storage devices located at many different physical locations. In such embodiments, database 110 may also be distributed over many different physical locations or in communication with other database not depicted within FIG. 1 to collectively manage database 110.

Cell site 114 may operate in an extremely high frequency region of the spectrum (e.g., from 30 GHz to 300 GHz), also known as the millimeter band. In some examples, cell site 114 may support millimeter wave communications with UEs 102A-102C, and extremely high frequency antennas of the respective devices may be even smaller and more closely spaced than ultra-high frequency antennas. Techniques disclosed herein may be employed across transmissions that use one or more different frequency regions, and designated use of bands across these frequency regions may differ by country or regulating body.

In aspects, cell site 114 utilizes a massive MIMO antenna array comprising 128 antennas, for example. In some aspects, 64 of those antennas are configured as downlink antennas and the other 64 are configured as uplink antennas. For example, all of the antennas having positive polarization are configured as the downlink antennas for transmitting signals, whereas those having negative polarization are configured as the uplink antennas for receiving signals. Continuing the example, the cell site 114 may provide 16 layers of MIMO transmission (e.g., four transmit antennas for beamformed transmission associated with one layer). In some embodiments, massive MIMO service is provided by cell site 114 via a different sized massive MIMO antenna array or with other types of antenna structures.

Cell site 114 may also employ beamforming (i.e., spatial filtering, directional transmission, or directional reception). During beamforming, some signals propagating at particular orientations with respect to the antenna array may experience constructive interference while others experience destructive interference. The cell site 114 may adjust the signals communicated via the antenna elements by applying amplitude offsets, phase offsets, or both. The adjustments associated with each of the antenna elements may be defined by a beamforming weight set associated with a particular orientation (e.g., with respect to the antenna array of the transmitting device or receiving device, or with respect to some other orientation). In aspects, cell site 114 employs sweeping techniques. For example, cell site 114 may transmit signals (e.g., reference signals, beam selection signals, synchronization signals, or other control signals) multiple times in a plurality of directions.

In some embodiments, the antenna array may be an active phased antenna array or a dynamic phased array. In other aspects, the antenna array may comprise monopole, loop, parabolic, traveling-wave, aperture, yagi-uda, conical spiral, helical, conical, radomes, horn, or apertures, or any combination thereof. In some aspects wherein the cell site 114 uses both 4G and 5G communication services, communication services eNB provides on one or more carriers that are different services than those the gNB provides on the one or more carriers. In some aspects, 4G services of the cell site 114 support five component carriers and the 5G services of the cell site 114 support sixteen contiguous and non-contiguous component carriers. The antenna array may support MIMO, MU-MIMO, cooperative MIMO, or massive MIMO techniques and protocols, in various embodiments.

When communicating in an unlicensed frequency spectrum, cell site 114 providing Wi-Fi services may perform a clear channel assessment prior to communicating to determine whether a channel is available. In embodiments, cell site 114 may comprise or be in communication with a small cell for providing an unlicensed frequency spectrum. When operating in an unlicensed frequency spectrum, the small cell may employ NR and use the same 5 GHz unlicensed frequency spectrum as used by Wi-Fi AP 150. The small cell, employing NR in the unlicensed spectrum, may boost coverage to increase capacity of the access network by modifying transmission powers of a primary carrier and a secondary carrier.

Cell site 114, whether a small cell or a large cell (e.g., a macro base station), may include an eNB, gNB, or another type of base station. Some cell sites, such as a gNB, may operate in a traditional sub 6 GHz spectrum, in millimeter wave frequencies, or near millimeter wave frequencies in communication with UEs 102A-102C. Communications using the millimeter wave or near millimeter wave frequency band (e.g., 3 GHz-300 GHz) involve high path loss and a short range. The cell site 114 providing unlicensed services may utilize beamforming with one or more of the UEs 102A-102C to compensate for the high path loss and short range.

Access point 116 may include one or more cell sites, base transmitter stations, radios, antennas, antenna arrays, power amplifiers, transmitters, receivers, digital signal processors, control electronics, GPS equipment, or a combination thereof. Access point 116 may perform functions of a cell site for repeating, extending or redirecting wireless communications. In aspects, the access point 116 is an indoor small cell involving a traditional standalone architecture processing across multiple radios distributed throughout an indoor environment. In aspects, the access point 116 is a small cell in communication with a macrocell via a heterogeneous network within the same footprint as an operator. In aspects, access point 116 is positioned in an indoor environment, or similar environment, and provides access to a wireless local area network or wireless personal area network. In aspects, the indoor environment is a multi-level structure, such as a building having a plurality of floors. In an implementation, the access point 116 may comprise a femtocell capable of facilitating communication according to an applicable cellular or wireless communication protocol.

Unlicensed band performance modifier 120 comprises receiver 122, determiner 124, modifier 126, and output 128. Unlicensed band performance modifier 120 may comprise a server having one or more processors. Unlicensed band performance modifier 120 is illustrated separately in FIG. 1; however, it may be a component of cell site 114. In other embodiments, the unlicensed band performance modifier 120 may be remotely located.

Receiver 122 may receive, among other things, data from user devices, such as UEs 102A-102C, within network 108 associated with cell site 114. The data received by the receiver 122 may be a part of historical data received from the user device, the historical data indicating various information about the user device and network performance. The data may be collected and stored in database 110 over a period of time. The receiver 122 may receive this data continuously or periodically. The data received may be used to provide information relating to a user device at a specific point in time or may be used to acquire historical patterns, such as patterns of user device locations or densities within a network over time. Further, in some embodiments, the receiver 122 may receive data from cell site 114, access point 116 and other servers.

Furthermore, data the receiver 122 may receive also includes location information corresponding to UEs 102A-102B, other UEs (not depicted), cell site 114, or a coverage area, for example. In embodiments, the location information is determined by the access point 116, the cell site 114, a location server, or the corresponding UE using GPS or other satellite location services, terrestrial triangulation, an access point location, or any other means of obtaining coarse or fine location information. Location information may include whether the corresponding UE is located outdoors or in a building. In embodiments, location information includes a geographic location of UE 102A and a three dimensional location.

In some embodiments, receiver 122 may receive location information stored in database 110 (e.g., location information stored in a cloud service). Continuing the example, database 110 may have current location information and historical location information comprising GPS coordinates. In embodiments, database 110 is updated with current location information after each subsequent predetermined time period (the predetermined time period configurable by a network operator, for example). In some embodiments, database 110 is updated during a predetermined time period (the predetermined time period configurable by a network operator, for example). In some embodiments, receiver 122 may receive location information corresponding to UE 102A from both the database 110 and an update message from the UE 102A.

Location information may include location coordinates for a UE (e.g., latitude and longitude) which may or may not include an altitude component (e.g., height above sea level, height above or depth below ground level, floor level, or basement level). Alternatively, a location of the UE may be expressed as a civic location (e.g., as a postal address). A location of the UE may also be expressed as an area or volume (defined either geographically or in civic form) and a probability or confidence level (e.g., 72%, 98%, etc.). A location of the UE may further be a relative location comprising a distance and direction or relative X, Y (and Z) coordinates defined relative to an origin at a known location, which may be defined geographically, in civic terms, or by reference to a point, area, or building plan.

In addition to location information, receiver 122 may also receive channel state information corresponding to various signals (e.g., a Wi-Fi signal, a control signal, etc.). In embodiments, channel state information may be provided for quantifying how communications are traveling over a particular communication channel, thereby indicating when communication performance is negatively impacted or impaired. As such, channel state information may indicate a strength of a received signal, a realized uplink or downlink transmission data rate of cell site 114 or UEs communicating with the cell site 114, observed SINR or signal strength at the UEs, or throughput of the connection between the cell site and the UEs.

Channel state information may include one or more of, for example, SINR, location data associated with UEs 102A-102C, channel load, sector load, band load, front-to-back ratio, upper side lobe suppression, or a combination thereof. Channel state information may indicate a measure of call quality for each of the user devices 102A-102C within the cell. SINR data may indicate the measured signal-to-noise ratio for each of the user devices 102A-102C. Location data may indicate a distance between each of the UEs and the cell site 114 or a direction. Channel load data may indicate the rate at which user devices are added or removed from communicating with an unlicensed bad used by at least one user device with a channel. Further, the channel load data may indicate a number of channels within a given band used by a user device, more than one user device, or a plurality of user devices. Sector load data may indicate the rate at which user devices are added or removed from communicating with the unlicensed band. Front-to-back ratio may indicate the ratio of signal broadcast in a target direction compared to a signal broadcast in an opposite direction. Upper side lobe suppression may indicate an amount of suppression of signal broadcast in a direction other than the target direction. Band load may indicate the rate at which user devices are added or removed from communicating with the unlicensed band.

In embodiments, the data received by receiver 122 may comprise communication parameters relating to the communication between cell site 114 and at least one user device. For example, in some embodiments communication parameters may comprise one or more of channel state information, SINR, a user device location, channel load, sector load, band load, access failures, or a combination thereof. Further, in some embodiments, receiver 122 may receive communication parameters associated with broadcasting antenna. For example, the receiver 122 may receive the front-to-back ratio, upper side lobe suppression. In some embodiments, the receiver 122 may receive network configuration information such as current broadcast mode (e.g. full power mode, beamform mode) and the phase, amplitude, power, or tilt weights values associated with the one or more antennas, antenna arrays, telecommunication towers, or cell sites.

In embodiments, receiver 122 receives channel state information comprising cell site heat signature information, cell site component performance information, or processor load measurements. For example, heat signature information of the cell site 114 includes component model, component type, manufacturer, age of a component, wear and tear due to environmental factors, etc. Further, additional channel state information received may also include an amount of current, backhaul link traffic, or an anticipated current or backhaul link traffic.

As another example, cell site 114 may receive millimeter wave feedback via a feedback reporting procedure comprising information about antenna configuration, signal-to-noise ratio, types of UE receivers, and so forth. The millimeter wave feedback may include downlink transmission data from cell site 114 transmitted at predetermined time intervals. In addition to the millimeter wave feedback, receiver 122 may also receive one or more fading measurements corresponding to one or more millimeter waves. Received fading measurements may depend upon (or may include information regarding) one or more of angular spread, fading amplitude, frequency domain level crossing rate, large-scale fading coefficients, small-scale fading coefficients, first-order fading statistics (e.g., for a short-term fading signal), second-order fading statistics, polarization at transmitter and receiver, distance between millimeter wave node and UE, or fast fading distribution changes from Rician to Nakagami.

In embodiments, receiver 122 receives RSRP and RSRQ data. For example, unlicensed bands may experience interference both indoors and outdoors due to RSRP and RSRQ. Fluctuations of RSRP or RSRQ over a period of time may impact fading measurements associated with interference and channel quality. In embodiments, receiver 122 may only receive RSRP and RSRQ data that satisfy a threshold value. Additionally, receiver 122 may receive channel state information corresponding to one or more Wi-Fi signals from one or more Wi-Fi access points. In embodiments, received Wi-Fi signal information includes an RSSI for one or more Wi-Fi access points for a plurality of locations of a geographical area. Receiver 122 also receives Wi-Fi access point location information corresponding to locations where Wi-Fi scans have occurred. Further, receiver 122 receives trace data comprising sensor logs of data output from sensors of UEs or other devices throughout the geographical area. An RSSI for the one or more Wi-Fi signals may weaken at distances that are farther from the location of the Wi-Fi access point. Additionally, Wi-Fi signal strength may be affected by a distance between a Wi-Fi router and a UE, a physical barrier deflecting the Wi-Fi signal, and the capability of a network adapter or antennas of the Wi-Fi access point.

In addition to Wi-Fi signal quality information, receiver 122 also receives channel state information corresponding to one or more control signals. For example, the receiver 122 may receive, from the control server of the cell site 114, disruption information relating to the control signal. In aspects, the receiver 122 may receive information corresponding to a change of the first coverage footprint to a second coverage footprint. Further, receiver 122 may receive, from the control server, a power level of the one or more multi-directional antennas or a power level change for modification of coverage provided by the multi-directional antenna.

Receiver 122 may receive transmission power information associated with a primary carrier and a secondary carrier. The receiver 122 may receive the transmission power information from the controller. For example, the controller may have transmission power information associated with a particular grant to a UE. The receiver 122 may receive the transmission power information from one or more UEs receiving transmission from the primary carrier and the secondary carrier. In aspects, receiver 122 receives a sum of the transmit power for each carrier (e.g., a sum of the primary carrier and a secondary carrier transmission powers, a sum of the secondary carrier transmission powers, or a sum of the primary carrier and multiple secondary carrier transmission powers). In aspects, receiver 122 receives a calculated power deficit associated with the transmission power of the primary carrier. In aspects, receiver 122 receives a transmission schedule for each of the carriers. In aspects, receiver 122 receives a sum of the transmit power for each carrier associated with a particular symbol at a particular time.

Receiver 122 may also receive channel state information pertaining to traffic volume (e.g., a number of UEs transmitting or receiving data via the one or more unlicensed bands, a number of UEs transmitting or receiving data via unlicensed Wi-Fi signals). Traffic volume may be received depending upon the day and time of day. For example, more channel state information may be received during a world event, such as a natural disaster, terror attack, or pandemic. Additionally, factors affecting channel state may include a quantity of users communicating via the unlicensed band or antenna properties at a time of receiving communication parameters via the unlicensed bands. Other factors affecting channel quality may also include a capacity of the unlicensed band and corresponding node, and data received from the quantity of users communicating via the unlicensed band. The data received from the quantity of users may comprise a rate at which UEs are connected to and disconnected from the unlicensed band.

Determiner 124 may determine a first transmission power associated with a primary carrier and a second transmission power associated with a secondary carrier. The first transmission power and the second transmission power may be determined from the transmission power information received from the controller associated with the cell site 114, from the transmission power information received from the one or more UEs, or a combination thereof. In some aspects, the determiner 124 determines the first transmission power and the second transmission power using individual transmission powers of each carrier. In some embodiments, determiner 124 determines the first transmission power using the sum of a plurality of transmission powers for the primary carrier. In some aspects, the sum of the plurality of transmission powers correspond to a particular time range. In some embodiments, determiner 124 determines the second transmission power using a sum of a plurality of transmissions associated with a plurality of secondary carriers.

Determiner 124 also determines that one or more user devices are within a range of a cell edge corresponding to the 5G New Radio unlicensed band. For example, the determiner 124 determines the user device is within the range of the cell edge using the received location data from the access point 116, the cell site 114, a location server, the corresponding UE, or a combination thereof. In some aspects, the corresponding UE is located outdoors, indoors, or within a subway location. In embodiments, the determiner 124 also determines that the corresponding UE is within the range of the cell edge using the received geographic location of the UE and a three dimensional location. In some aspects, the determiner 124 uses a latitude, longitude and an altitude received. In some aspects, the determiner 124 uses the altitude component (e.g., height above sea level, height above or depth below ground level, floor level, or basement level). Alternatively, a location of the UE may be expressed as a civic location (e.g., as a postal address). In some aspects, the determiner 124 determines the location using received location data associated with a particular confidence level.

The determiner 124 may also use information received from the cell site 114 associated with the coverage area having the cell edge corresponding to the 5G New Radio unlicensed band to determine that the UE is within the range of a cell edge corresponding to the 5G New Radio unlicensed band. The cell edge may be located at a boundary of a particular coverage area, the boundary located at a distance from the cell site 114. In aspects, neighboring cell sites or access points may cause higher interference to unlicensed band communications between a UE within the range of the cell edge than that of a UE outside of the range of the cell edge and closer to the cell site 114. In aspects, proximity to the cell edge may result in higher interference to unlicensed band communications between the UE and cell site 114 based on the distance from the cell site 114.

Determiner 124 may also detect increases in antenna gain corresponding to one or more antenna elements of an antenna array of cell site 114 using information received by receiver 122. For example, the determiner 124 may detect of 3 dBi antenna gain corresponding to the one or more antenna elements that provide transmissions for UEs to communicate using an unlicensed band. The antenna gain is a measure of maximum effectiveness with which the corresponding antenna radiates power delivered to it via the transmitter towards a target. For example, the antenna gain is a maximum radiation intensity produced by the antenna compared to radiation received by a radiator (e.g., a lossless isotropic radiator) supplied with a level of power. The determiner 124 may determine increases in the antenna gain using information received by one or more of the controller of the cell site, a server, one or more UEs, or the radiator.

Determiner 124 may determine the interference data associated with a primary carrier or a secondary carrier is above a threshold. In addition, determiner 124 may determine the channel state information associated with an uplink or a downlink corresponding to the primary carrier or the secondary carrier is below a threshold. For example, determiner 124 may determine a strength of a signal received by the cell site 114 or by a UE is above a predetermined threshold. As another example, determiner 124 may determine a realized uplink or downlink transmission data rate of cell site 114 is above a predetermined threshold. As another example, determiner 124 may determine observed SINR or signal strength at a plurality of UEs is above a predetermined threshold. The determiner 124 may also determine a throughput of a connection between the cell site 114 and one or more UEs is above the threshold.

In aspects, determiner 124 may determine that the interference data associated with an unlicensed band and associated with the primary carrier or the secondary carrier providing services via an unlicensed band is above a threshold based on one or more of SINR, location data associated with UEs 102A-102C, channel load, sector load, band load, front-to-back ratio, and upper side lobe suppression. Determiner 124 may determine that the interference data is above a threshold based on one or more of current broadcast mode (e.g. full power mode, beamform mode) and the phase, amplitude, power, and tilt weights values associated with the one or more antennas, antenna arrays, telecommunication towers, or cell sites. Determiner 124 may determine that the interference data is above a threshold based on one or more of an amount of current, backhaul link traffic, and an anticipated current or backhaul link traffic. Determiner 124 may determine that the interference data is above a threshold based on millimeter wave feedback comprising information about antenna configuration, signal-to-noise ratio, or types of UE receivers.

Further, determiner 124 may determine that the interference data associated with the unlicensed band is above the threshold or that the channel state information associated with an uplink or a downlink corresponding to the primary carrier or the secondary carrier providing unlicensed band services based on received RSRP and RSRQ data. For example, channel state information associated with an indoor or outdoor environment may include changes to previously received RSRP and RSRQ that the determiner 124 analyzes. In embodiments, determiner 124 automatically determine the interference data is above the threshold upon receiving RSRP and RSRQ data satisfying a predetermined threshold value. In embodiments, determiner 124 determines the interference data is above the threshold using received Wi-Fi signal information including an RSSI for a Wi-Fi access point for a geographical area. In embodiments, determiner 124 determines the interference data is above the threshold using trace data comprising sensor logs of data output from sensors of UEs or other devices throughout the geographical area.

Modifier 126 may modify the first transmission power associated with the primary carrier or the second transmission power associated with the secondary carrier based on the data received by receiver 122 and one or more determinations made by determiner 124. For example, the modifier 126 may reduce the second transmission power associated with the secondary carrier based on the data received by receiver 122 and one or more determinations made by determiner 124. In some embodiments, the modifier 126 may increase the first transmission power associated with the primary carrier based on the data received by receiver 122 and one or more determinations made by determiner 124. In some aspects, the modifier 126 may decrease a transmission power upon detecting an increase in antenna gain corresponding to the one or more antenna elements associated with an unlicensed band.

In embodiments, modifier 126 may modify the first or second transmission power by applying a beamforming technique to the antenna array of the cell site 114 for downlink transmissions via a 5G New Radio unlicensed band, the downlink transmissions associated with the primary or secondary carrier. The beamforming technique may be applied based on the location of the user device. The beamforming technique may include some signals propagating at particular orientations with respect to the antenna array that experience constructive interference while other signals experience destructive interference. The modifier 126 may adjust the signals communicated via the antenna elements by applying amplitude offsets, phase offsets, or both. The signals may be adjusted based on the data received by receiver 122 and one or more determinations made by determiner 124. The adjustments associated with each of the antenna elements may be defined by a beamforming weight set associated with a particular orientation (e.g., with respect to the antenna array of the transmitting device or receiving device, or with respect to some other orientation). In aspects, modifier 126 employs sweeping techniques. By applying the beamforming technique, energy is directional to the UE (e.g., the UE experiencing interference or located near the cell edge), thereby reducing interference and increasing capacity of the unlicensed band.

In embodiments, modifier 126 may modify transmissions via the primary carrier or secondary carrier for communications via an unlicensed band by implementing a noise floor to reduce interference (e.g., inter-band interferences) associated with the channel state information that is above a corresponding threshold. For example, modifier 126 may limit one or more signals from transmissions via the primary carrier or secondary carrier for communications via an unlicensed band. In some aspects, modifier 126 may modify the transmissions so that any measured amplitude is, on average, no less than the noise floor implemented. In aspects, the noise floor is dynamically changed for any determined changes in the interference data determined by determiner 124. In aspects, the noise floor is associated with one or more transmission powers of the transmission for the communications via the unlicensed band. In an embodiment, the noise floor may be an amplitude measure selected to distinguish RF energies associated with actual signals from noise.

In embodiments, modifier 126 may modify a frequency associated with the primary carrier or the secondary carrier providing services via an unlicensed band. In aspects, the frequency of the carrier wave is varied in proportion to a varying amplitude of the modulating signal. The resulting modification results in decreased noise and interference and improves the quality of RF reception. In addition, modifier 126 may modify a transmission power of the modified frequency based on the modification to the frequency.

In embodiments, modifier 126 may modify transmissions via the primary carrier or secondary carrier for communications via an unlicensed band by implementing a listen-before-talk deployment in the unlicensed band based on the data received by receiver 122 and one or more determinations made by determiner 124. In embodiments, listen-before-talk is deployed for only the transmissions via a secondary carrier. In embodiments, listen-before-talk is deployed for only the transmissions via the primary carrier. In embodiments, listen-before-talk is deployed before each transmission by the primary carrier. In embodiments, listen-before-talk is deployed for each downlink and uplink transmission by the primary carrier for a particular period of time such that a system (e.g., environment 100) may utilize the entire unlicensed band for uplink and downlink during that period of time.

Figure 2:
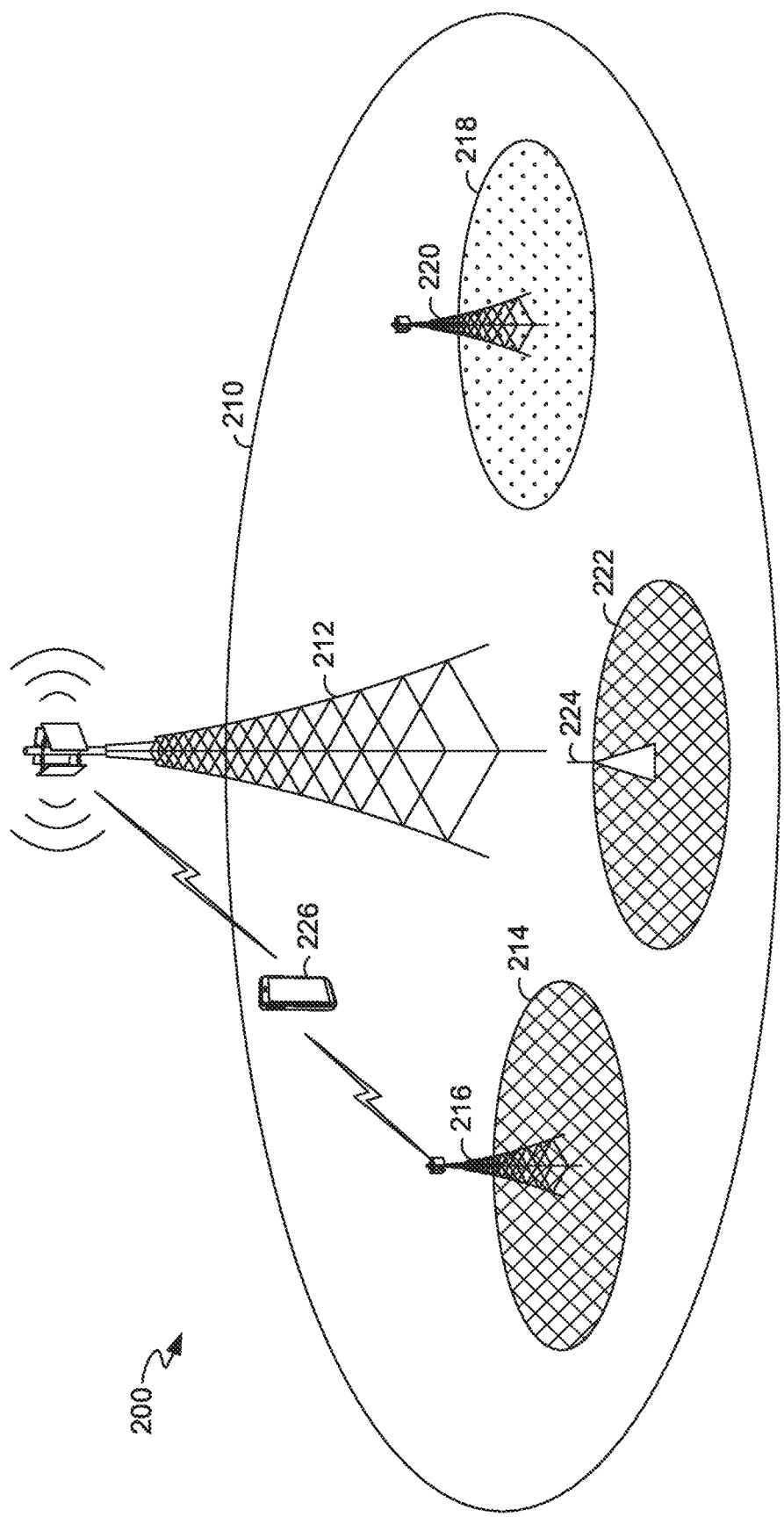
FIG. 2 depicts another example environment comprising a plurality of access points providing downlink transmissions for licensed bands and unlicensed bands, in accordance with aspects herein.

Turning now to FIG. 2, environment 200 depicts an environment comprising licensed and unlicensed bands. Environment 200 comprises coverage area 210, cell sites 212, 216, 220, and 224, licensed and unlicensed band coverage areas 214 and 222, unlicensed band coverage area 218, and UE 226. In coverage areas 214, 218, and 222, clear channel assessment may be employed by the unlicensed bands for avoiding collision.

In aspects, cell site 212 receives channel state information associated with telecommunication services provided via coverage area 210 from user device 226, which is configured to utilize the telecommunication services via a primary carrier and a secondary carrier. In aspects, cell site 216 receives channel state information associated with telecommunication services provided via coverage area 214 from user device 226, which is configured to utilize the telecommunication services via a primary carrier and a secondary carrier. In aspects, cell site 224 receives channel state information associated with telecommunication services provided via coverage area 222 from a UE located within coverage area 222, which is configured to utilize the telecommunication services via a primary carrier and a secondary carrier. In aspects, the primary carrier corresponds to a licensed band and the secondary carrier corresponds to an unlicensed band. In some aspects, the primary and secondary carriers provide uplink or downlink transmissions for a 5G NR unlicensed band.

Based on the channel state information received, cell sites 212, 216, and 224 determine an interference measurement associated with the secondary carrier is above a threshold. Based on the channel state information received, cell sites 212, 216, and 224 may also determine an interference measurement associated with the primary carrier is above or below a threshold. Based on the channel state information received, cell sites 212, 216, and 224 determine UE 226 or the UE located within coverage area 222 is within a range or a distance of a cell edge corresponding to an antenna array of cell sites 212, 216, and 224. In some aspects, cell sites 212, 216, and 224 determine that an antenna gain corresponding to one or more antenna elements of the corresponding cell site has increased. In some embodiments, the antenna gain corresponds to the antenna array providing the unlicensed band telecommunication services via only the primary carrier or only the secondary carrier.

Based on the interference measurement being above the threshold, a first transmission power of the primary carrier or a second transmission power of the secondary carrier is modified. For example, the second transmission power may be reduced based on the interference data being above the threshold and based on a location of the corresponding UE (UE 226 or the UE located within coverage area 222). As another example, the first transmission power may be increased based on the interference data associated with the secondary carrier being above the threshold. The first transmission power may be increased based on a location of the corresponding UE or based on locations of a plurality of UEs. Additionally, the second transmission power may be reduced and the first transmission power increased based on the corresponding UE being located within the range or distance of the cell edge. In some aspects, the first transmission power is increased based on interference data of the primary carrier being below a threshold. In some aspects, based on a detected increase of antenna gain of 3 dBi, the first or second transmission power is reduced by 1 dBm. In some aspects, both the first transmission power and the second transmission power are reduced by 1 dBm based on the detected increase of antenna gain, wherein the second transmission is reduced to a lower power than the first transmission power. In some aspects, the first transmission power or the second transmission power is modified by applying a beamforming technique based on a location of one or more UEs for downlink transmissions via a 5G NR unlicensed band.

In aspects, cell site 220 receives channel state information associated with telecommunication services provided via coverage area 218 from one or more user devices located within coverage area 218, which provides telecommunication services via a primary carrier and a secondary carrier. The primary and secondary carriers provide uplink and downlink transmissions for a 5G NR unlicensed band. In aspects, cell site 220 receives channel state information associated with telecommunication services provided via coverage area 218 from the one or more user devices, which are configured to utilize the telecommunication services via the primary carrier and the secondary carrier.

Cell site 220 determines a first transmission power for the primary carrier and a second transmission power for the secondary carrier. Based on the channel state information received, cell site 220 also determines an interference measurement associated with the secondary carrier is above a threshold. Based on the channel state information received, cell site 220 may also determine an interference measurement associated with the primary carrier is above or below a threshold. Based on the channel state information received, cell site 220 determines the one or more user devices located within coverage area 218 are within a range or a distance of a cell edge corresponding to an antenna array of cell site 220. In some aspects, cell site 220 determines that an antenna gain corresponding to one or more antenna elements of the cell site 220 has increased.

Based on the interference measurement being above the threshold, a first transmission power of the primary carrier or a second transmission power of the secondary carrier is modified. For example, the second transmission power may be reduced based on the interference data being above the threshold and based on a location of the corresponding UE. As another example, the first transmission power may be increased based on the interference data associated with the secondary carrier being above the threshold. The first transmission power may be increased based on a location of the corresponding UE or based on locations of a plurality of UEs. Additionally, the second transmission power may be reduced and the first transmission power increased based on the corresponding UE being located within the range or distance of the cell edge. In some aspects, the first transmission power is increased based on interference data of the primary carrier being below a threshold. In some aspects, based on a detected increase of antenna gain of 3 dBi, the first or second transmission power is reduced by 1 dBm. In some aspects, both the first transmission power and the second transmission power are reduced by 1 dBm based on the detected increase of antenna gain, wherein the second transmission is reduced to a lower power than the first transmission power. In some aspects, the first transmission power or the second transmission power is modified by applying a beamforming technique based on a location of one or more UEs for downlink transmissions via a 5G NR unlicensed band.

Figure 3:
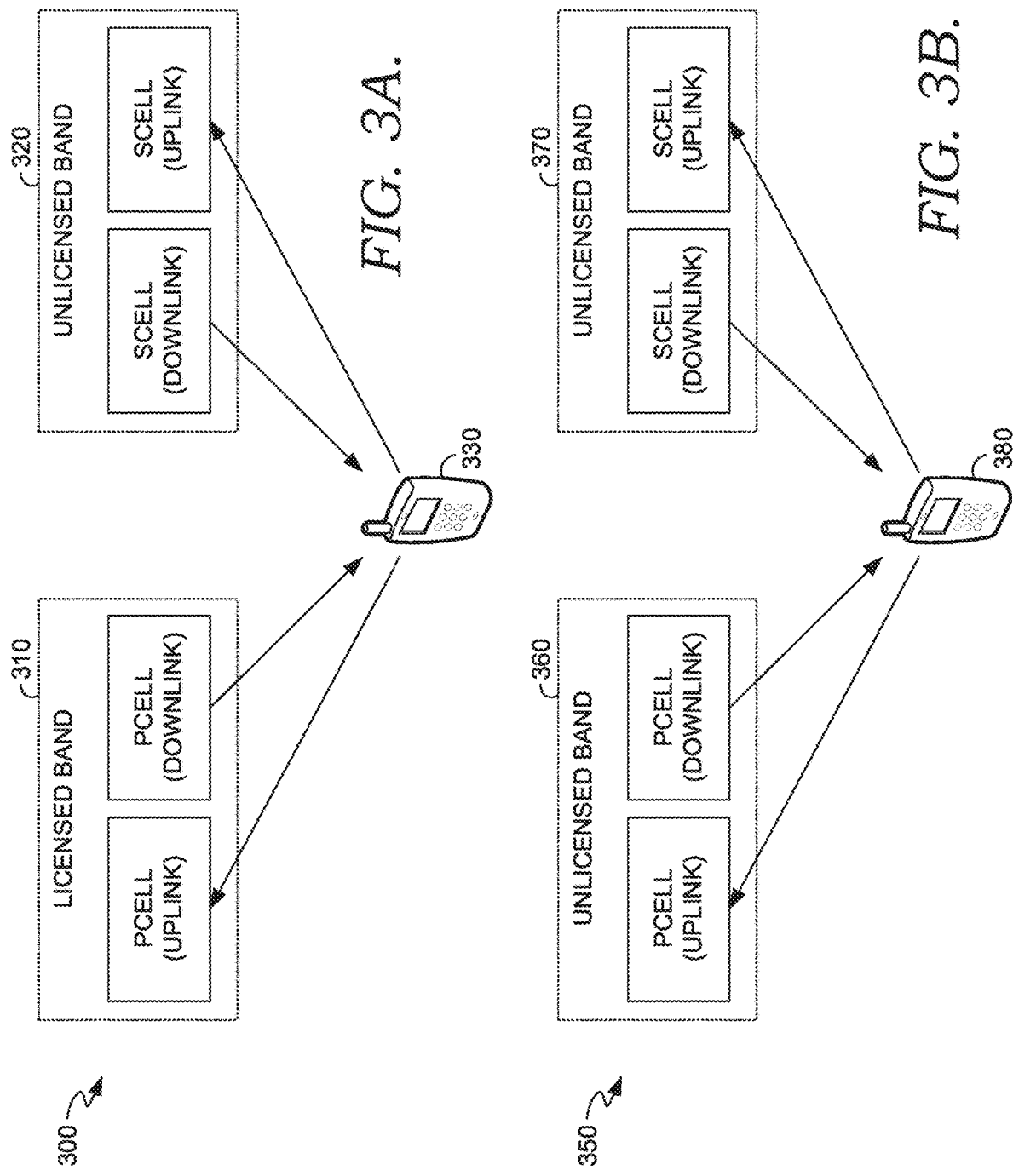
FIG. 3A depicts an example environment comprising uplink and downlink communications via a licensed band and an unlicensed band associated with a user device, in accordance with aspects herein.
FIG. 3B depicts an example environment comprising uplink and downlink communications via unlicensed bands associated with a user device, in accordance with aspects herein.

FIG. 3A depicts a computing device transmitting and receiving signals of a licensed and unlicensed band. Environment 300 comprises a licensed band 310 including a primary carrier uplink and a primary carrier downlink, an unlicensed band 320 including a secondary carrier downlink and a secondary carrier uplink, and UE 330.

In aspects, UE 330 transmits information of licensed band 310 and the unlicensed band 320 to receiver 122 depicted in FIG. 1. For example, the information transmitted may include SINR, channel load, sector load, band load, front-to-back ratio, upper side lobe suppression, or a combination thereof. UE 330 may provide channel state information to the receiver 122 using the primary carrier uplink, the secondary carrier uplink, or both. The channel state information may indicate a strength of a received signal associated with the licensed band 310 and the unlicensed band 320 and a realized uplink or downlink transmission data rate associated with the licensed band 310 and the unlicensed band 320. In some embodiments, UE 330 may provide RSSI measurements for one or more Wi-Fi access points associated with the unlicensed band 320.

FIG. 3B depicts a computing device transmitting and receiving signals of unlicensed bands. Environment 350 comprises unlicensed band 360 including a primary carrier uplink and a primary carrier downlink, an unlicensed band 370 including a secondary carrier downlink and a secondary carrier uplink, and UE 380.

In aspects, UE 380 transmits information of unlicensed band 360 and unlicensed band 370 to receiver 122 depicted in FIG. 1. For example, the information transmitted to receiver 122 may include SINR, channel load, sector load, band load, front-to-back ratio, upper side lobe suppression, or a combination thereof. UE 380 may provide channel state information to the receiver 122 using the primary carrier uplink, the secondary carrier uplink, or both. The channel state information may indicate a strength of a received signal associated with unlicensed band 360 and unlicensed band 370 and a realized uplink or downlink transmission data rate associated with unlicensed band 360 and unlicensed band 370. In some embodiments, UE 380 may provide RSSI measurements for one or more Wi-Fi access points associated with unlicensed band 360 and unlicensed band 370.

Figure 4:
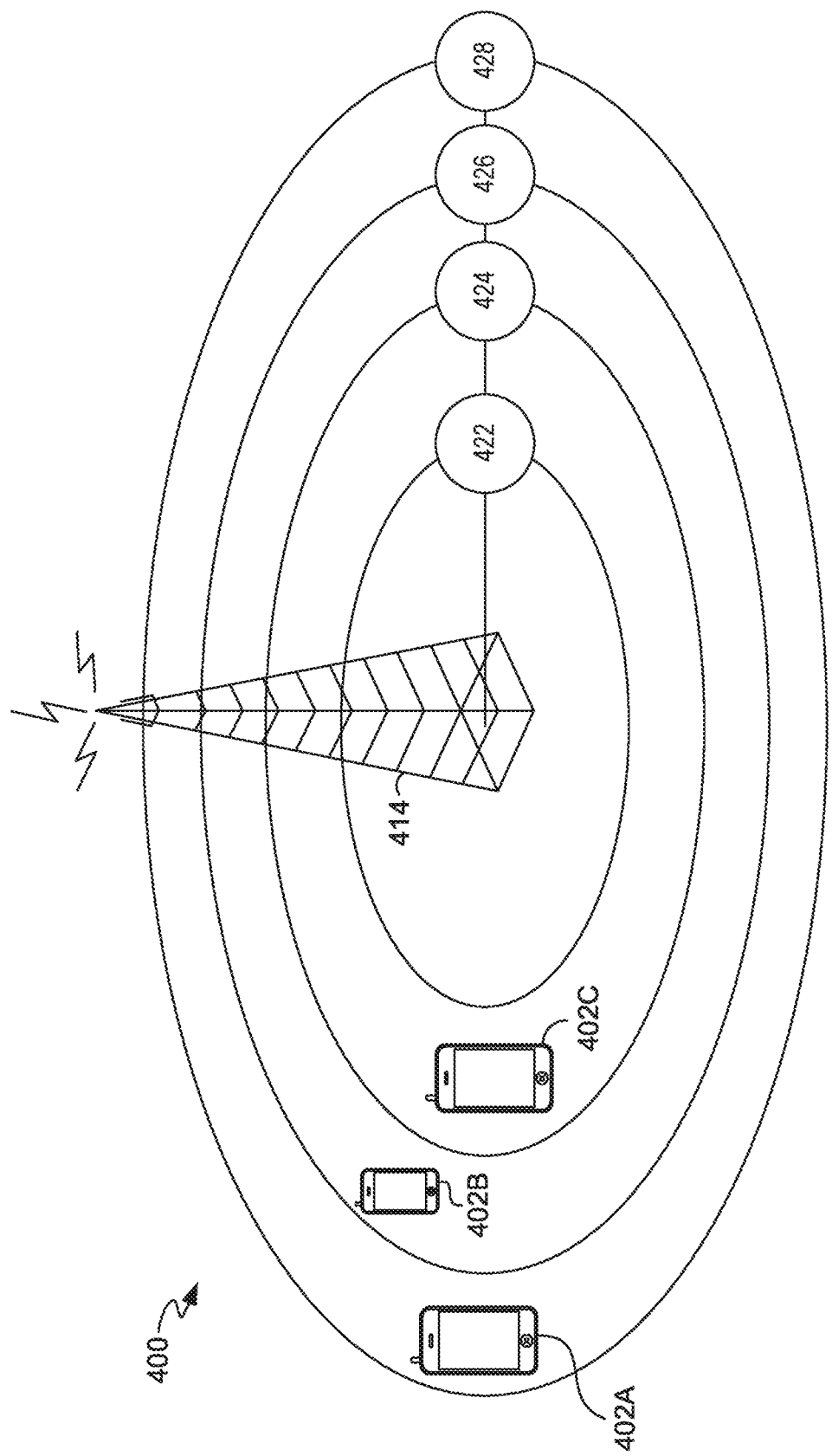
FIG. 4 illustrates an example environment comprising a cell site configuration for optimizing coverage and power usage in a network deploying an unlicensed band, in accordance with aspects herein.

FIG. 4 depicts an example environment 400 comprising UEs 402A-402C, cell site 414, and a coverage area having concentric bands 422, 424, 426, and 428 with a different radius or distance from the cell site 414. UE 402A is located in the coverage area between concentric bands 422 and 424. UE 402B is located in the coverage area between concentric bands 424 and 426. UE 402C is located in a coverage area between concentric bands 426 and 428.

The coverage area provided by cell site 414 having concentric bands 422, 424, 426, and 428, each having a different radius or distance from the cell site 414. In an embodiment, the cell edge of the coverage area is defined by concentric band 428. In an embodiment, the cell site 414 may determine that a received signal from UE 402A was transmitted from a location between concentric bands 426 and 428. The transmission from the UE 402A may comprise an outgoing call within an approximate range or distance from the cell edge (e.g., the coverage area between concentric bands 426 and 428). In another example, the cell site 414 may determine that a received signal from UE 402B was transmitted from a location between concentric bands 424 and 426.

In an embodiment, cell site 414 may determine a first transmission power associated with a primary carrier and a second transmission power associated with a secondary carrier provided by the coverage area. The cell site 414 may receive location data from UEs 402A-402C that are utilizing services of the primary carrier and the secondary carrier. In an embodiment, uplink and downlink transmissions associated with both the primary carrier and the secondary carrier correspond to an unlicensed band. In some aspects, the unlicensed band is provided via the cell site 414 and the coverage area, the system is associated with the 6 GHz spectrum (e.g., 1,200 megahertz of spectrum available for unlicensed use in the 5.925-7.125 GHz), the 5G NR-U spectrum, or the 60 GHz millimeter wave band.

In embodiments, the cell site 414 receives location information associated with the UEs 402A-402C and interference data associated with the unlicensed band spectrum provided. The location data may correspond to the concentric bands 422, 424, 426, and 428. Based at least in part on the location data received, cell site 414 determines that UE 102A is within a range or distance of the cell edge corresponding to the 5G New Radio unlicensed band, such as between concentric bands 426 and 428. Further, based on the interference data received, cell site 414 determines the interference data is above a threshold.

Based on the location data and the interference data being above the threshold, cell site 414 reduces the second transmission power associated with the secondary carrier. For example, based on determining UE 402A is within the distance or range of the cell edge (e.g., the cell edge being concentric band 428), cell site 414 reduces the second transmission power associated with the secondary carrier. In some aspects, the cell site 414 additionally increases the first transmission power of the primary carrier. In some aspects, the cell site 414 increases the first transmission power based on interference data of the primary carrier being below a threshold. In some aspects, the interference data is associated with both a downlink and uplink.

FIGS. 5A and 5B illustrate example tables comprising transmit power, antenna gain, and effective isotropic radiated power. For example, increases of antenna gain corresponding to one or more antenna elements of an antenna array may be detected. The antenna gain may be associated with a primary carrier or a secondary carrier corresponding to an unlicensed band. In aspects, a detected increase of 3 dBi antenna gain corresponding to the one or more antenna elements may be detected. Upon the detection of the antenna gain (e.g., the 3 dBi antenna gain), the transmit power is decreased by 1 dBm. In some aspects, the decreased transmit power is associated with the primary carrier or the secondary carrier. In some aspects, the transmit power is automatically decreased upon detection of a particular antenna gain (e.g., 3 dBi antenna gain). As such, a system may provide better cell throughput and coverage for UEs and other devices.

Figure 6:
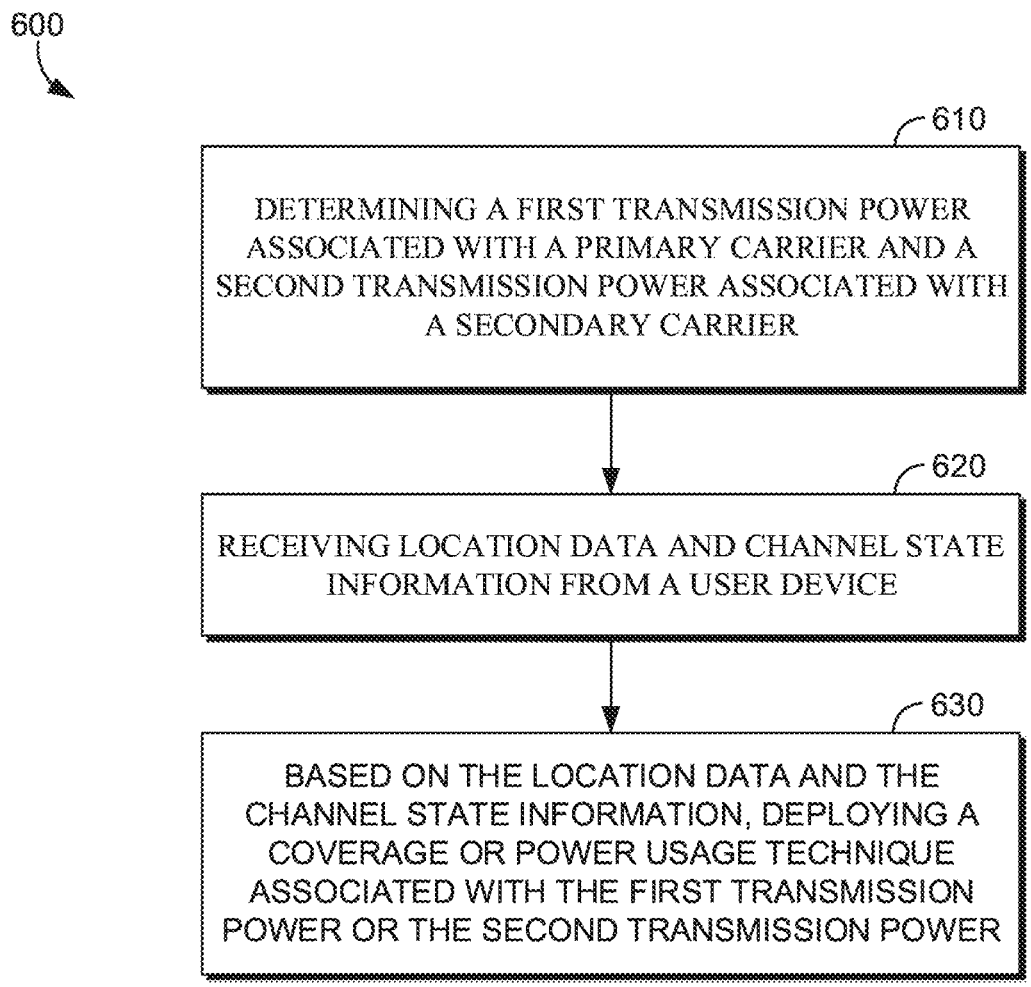
FIG. 6 depicts a flow diagram of an example method for optimizing coverage and power usage in a network deploying an unlicensed band, in accordance with aspects herein.

Turning now to FIG. 6, flow diagram 600 depicts an example method for optimizing coverage and power usage in a network deploying an unlicensed band. At 610, a first transmission power associated with a primary carrier and a second transmission power associated with a secondary carrier are determined. In some embodiments, the primary carrier and the secondary carrier provide downlink transmissions for a 5G New Radio unlicensed band. In some embodiments, the primary carrier and the secondary carrier provide uplink transmissions for a 5G New Radio unlicensed band.

At 620, location data and channel state information is received from a user device. In some embodiments, an interference measurement is determined based on the received channel state information. In some embodiments, the interference measurement is associated with the primary carrier or the secondary carrier. In some aspects, the interference measurement is determined to be above or below a threshold. For example, the interference measurement may be associated with the secondary carrier and may be above the threshold. In some aspects, it is determined that the user device is within a distance or a range of a cell edge corresponding to a 5G New Radio unlicensed band based on the location data.

At 630, a coverage or power usage technique associated with the first transmission power or the second transmission power is deployed based on the location data and the channel state information. In some aspects, the second transmission power is reduced based on the location data and the interference data being above the threshold. In some aspects, the first transmission power is also increased. In some aspects, the first transmission power is modified, based on the interference data being above the threshold, by applying a beamforming technique. For example, the beamforming technique may be based on the location data of the user device. In some embodiments, the beamforming technique is applied based on the location data of the user device and a plurality of user devices.

Figure 7:
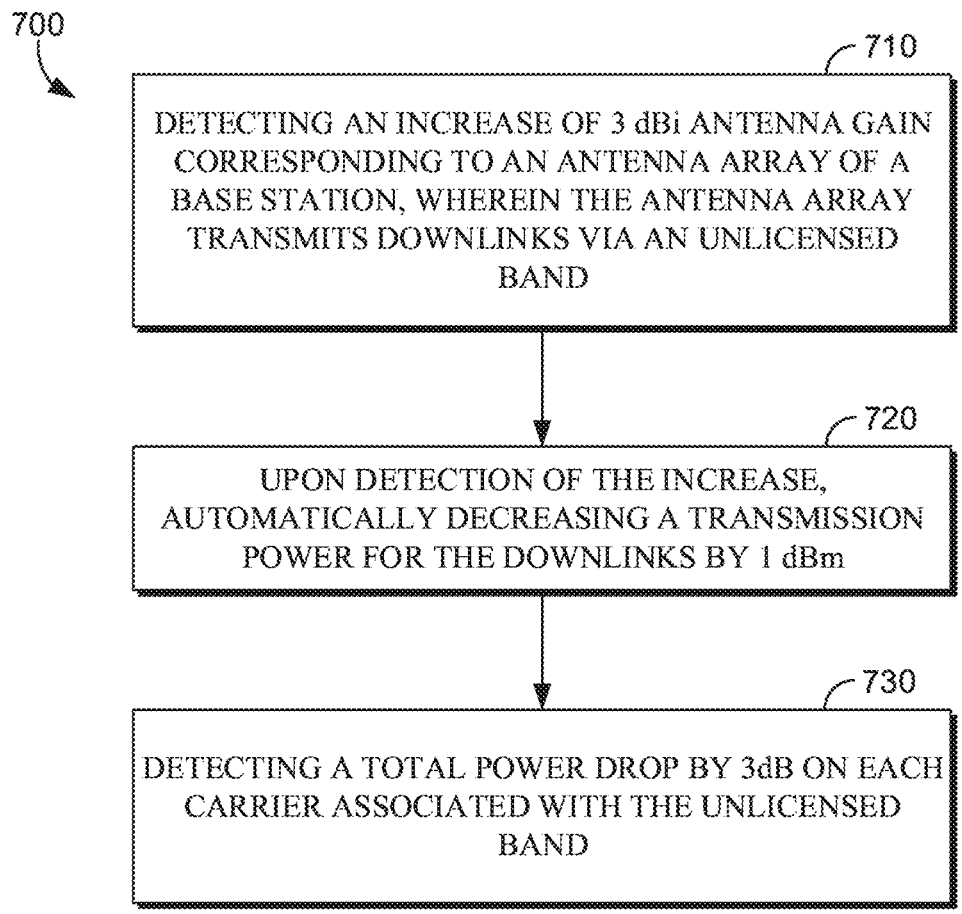
FIG. 7 depicts a flow diagram of an example method for optimizing coverage and power usage in a network deploying an unlicensed band, in accordance with aspects herein.

Turning now to FIG. 7, flow diagram 700 depicts an example method for optimizing coverage and power usage in a network deploying an unlicensed band. At 710, the method detects an increase of antenna gain (e.g., 3 dBi antenna gain) corresponding to an antenna array of a cell site. The antenna array transmits downlinks via an unlicensed band. In some embodiments, the antenna array transmits uplinks via the unlicensed band. At 720, upon detecting the increase of 3 dBi antenna gain, the method automatically decreases a transmission power by 1 dBm. In some aspects, the decrease in transmission power is associated with the downlinks. At 730, a total power drop by 3 dB on each carrier associated with the unlicensed band is detected.

Figure 8:
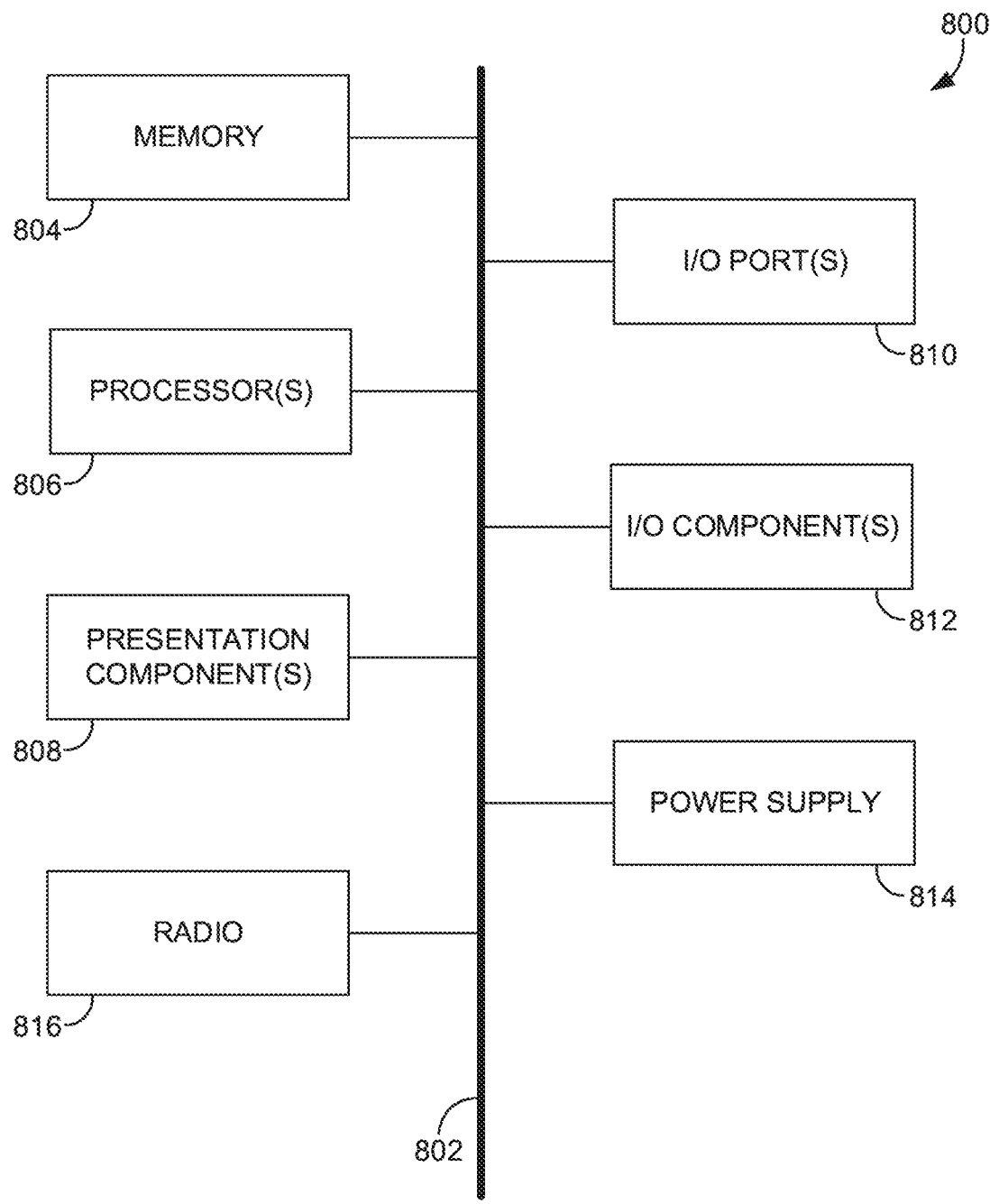
FIG. 8 depicts an exemplary computing environment suitable for use in implementations of the present disclosure, in accordance with aspects herein.

Turning now to FIG. 8, a diagram is depicted of an exemplary computing environment suitable for use in implementations of the present disclosure. In particular, the exemplary computer environment is shown and designated generally as UE/user device 800. User device 800 is but one example of a suitable computing environment and is not intended to suggest any limitation as to the scope of use or functionality of the invention. Neither should user device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, user device 800 includes bus 802 that directly or indirectly couples the following devices: memory 804, one or more processors 806, one or more presentation components 808, input/output (I/O) port(s) 810, I/O component(s) 812, power supply 814, and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 800 typically includes a variety of computer-readable media. Computer-readable media can be any available media that can be accessed by user device 800. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 804, memory 804 includes computer-storage media in the form of volatile or nonvolatile memory. Memory 804 may be removable, nonremovable, or a combination thereof. Examples of memory 804 include solid-state memory, hard drives, optical-disc drives, etc. For instance, memory 804 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 806, the one or more processors 806 read data from various entities such as bus 802, memory 804 or I/O component(s) 812. The one or more processors 806 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 806 execute instructions, for example, of an Operating System of the user device 800 or of one or more suitable applications.

Further, the one or more presentation components 808 present data indications to a person or other device. Examples of one or more presentation components 808 include a display device, speaker, printing component, vibrating component, etc. Additionally, I/O port(s) 810 allow user device 800 to be logically coupled to other devices including I/O component(s) 812, some of which may be built in user device 800. Illustrative I/O component(s) 812 include a microphone, joystick, game pad, satellite dish, scanner, printer, wireless device, etc. Furthermore, power supply 814 may include any suitable source of power, such as a rechargeable lithium polymer battery or an alternating current power converter.

Turning to radio 816, the radio 816 facilitates communication with a wireless telecommunications network. For example, radio 816 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 816 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1 ½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via millimeter waves, FD-MIMO, massive MIMO, 3G, 4G, 5G, or 802.11 protocols and techniques, etc.

Illustrative wireless telecommunications technologies that radio 816 may facilitate include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for optimizing coverage and power usage in a network deploying an unlicensed band, the system comprising:
   a first set of antenna elements and a second set of antenna elements; and
   one or more processors corresponding to the first set of antenna elements and the second set of antenna elements, the one or more processors configured to execute operations comprising:
   determining that a first amount of transmission power is needed to transmit a signal on unlicensed spectrum from the first set of antenna elements to a user device on each of a first carrier and a second carrier;
   determining that the user device is a threshold distance from the first set of antenna elements; and
   transmitting, via the second set of antenna elements using the first carrier, a set of signals to the user device using a second amount of transmission power that is lower than the first amount of transmission power.

2. The system according to claim 1, wherein the set of signals are transmitted by applying a beamforming technique using the second set of antenna elements via a 5G NR unlicensed band.

3. The system according to claim 1, wherein the second set of antenna elements corresponds to a Wi-Fi access point associated with the unlicensed spectrum.

4. The system according to claim 1, the operations further comprising:
   determining that a location of the user device corresponds to a cell edge associated with the unlicensed spectrum; and
   based on determining the location of the user device corresponds to the cell edge, transmitting the set of signals to the user device using the second amount of transmission power.

5. The system according to claim 1, the operations further comprising:
   determining that an antenna gain associated with the first set of antenna elements is above a threshold; and
   based on determining that the antenna gain associated with the first set of antenna elements is above the threshold, transmitting the set of signals to the user device using the second amount of transmission power.

6. The system according to claim 5, wherein the threshold for the antenna gain is an increase of 3 dBi.

7. The system according to claim 1, wherein determining that the user device is the threshold distance from the first set of antenna elements is based on receiving, from the user device, a Received Signal Strength Indicator measurement, and wherein the first set of antenna elements correspond to a Wi-Fi access point.

8. The system according to claim 1, wherein the set of signals are transmitted based on receiving interference data associated with the second carrier from the user device.

9. The system according to claim 8, wherein the interference data includes Reference Transmission Receive Power and Reference Transmission Receive Quality.

10. The system according to claim 1, wherein the set of signals are transmitted based on receiving interference data associated with the second carrier from a plurality of other user devices.

11. A method for optimizing coverage and power usage in a network deploying an unlicensed band, the method comprising:
   determining that a first amount of transmission power is needed to transmit a signal on unlicensed spectrum from a first set of antenna elements to a user device on each of a first carrier and a second carrier;
   determining that the user device is a threshold distance from the first set of antenna elements; and
   transmitting, via a second set of antenna elements using the second carrier, a set of signals to the user device using a second amount of transmission power that is lower than the first amount of transmission power.

12. The method according to claim 11, wherein determining that the user device is the threshold distance from the first set of antenna elements is based on receiving a Received Signal Strength Indicator measurement, from the user device, corresponding to one or more Wi-Fi signals.

13. The method according to claim 11, wherein the set of signals are transmitted by applying a beamforming technique using the second set of antenna elements.

14. The method according to claim 11, wherein the set of signals are transmitted to the user device using the second amount of transmission power based on an antenna gain associated with the first set of antenna elements being above a threshold.

15. The method according to claim 11, wherein the set of signals are transmitted to the user device using the second amount of transmission power based on one or more fading measurements being above a threshold, the one or more fading measurements received from the user device and corresponding to one or more millimeter waves.

16. The method according to claim 11, wherein the set of signals are transmitted to the user device using the second amount of transmission power based on a rate at which user devices are connecting with each of the first carrier and the second carrier for the unlicensed spectrum.

17. One or more non-transitory computer storage media having computer-executable instructions embodied thereon that, when executed by one or more processors, cause the one or more processors to perform a method, the method comprising:
   determining that a first amount of transmission power is needed to transmit a signal on unlicensed spectrum from a first set of antenna elements to a user device on a first carrier;
   determining that the user device is a threshold distance from the first set of antenna elements; and
   transmitting, via a second set of antenna elements using the first carrier, a set of signals on the unlicensed spectrum to the user device using a second amount of transmission power that is lower than the first amount of transmission power.

18. The one or more non-transitory computer storage media of claim 17, wherein the set of signals are transmitted by applying a beamforming technique using the second set of antenna elements via an unlicensed band.

19. The one or more non-transitory computer storage media of claim 17, wherein the second set of antenna elements corresponds to a Wi-Fi access point associated with the unlicensed spectrum.

20. The one or more non-transitory computer storage media of claim 17, wherein the first set of antenna elements and the second set of antenna elements correspond to a base station.

* * * * *